Dec. 30, 1969 SHIGEJI SAWADA 3,486,532
METHOD OF MAKING A CORRUGATED HOSE
Filed Aug. 4, 1966 2 Sheets-Sheet 1
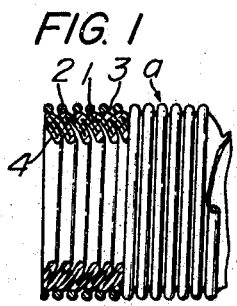
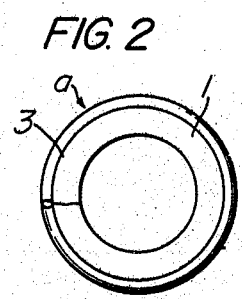
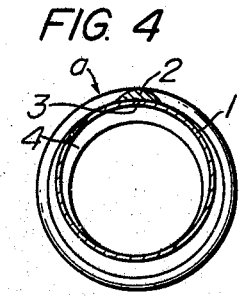
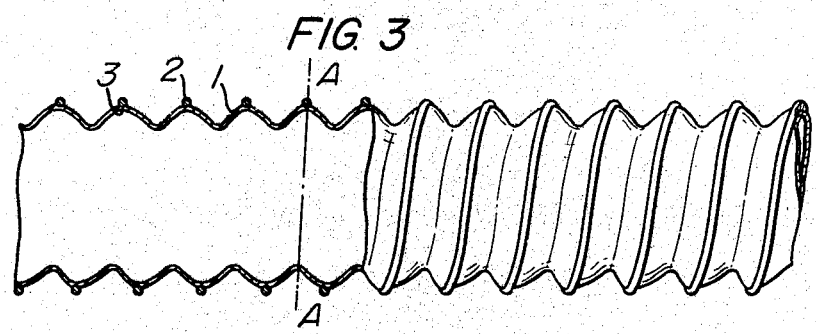
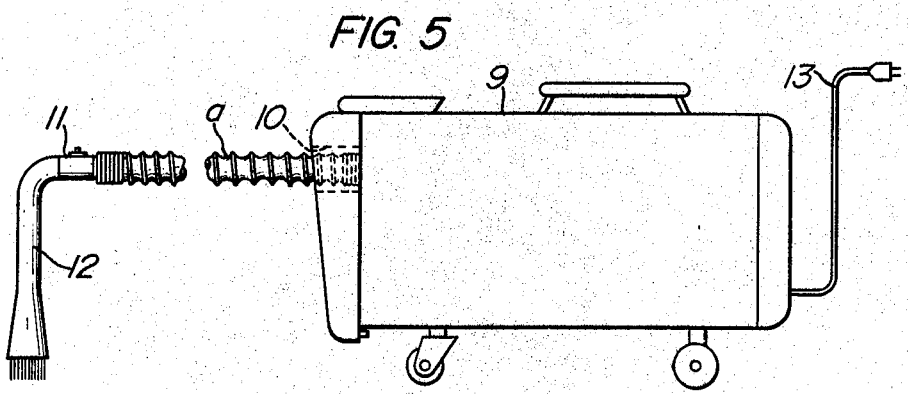

United States Patent Office 3,486,532
Patented Dec. 30, 1969

3,486,532
METHOD OF MAKING A CORRUGATED HOSE
Shigeji Sawada, Ashiya-shi, Japan, assignor, by direct and mesne assignments, to Tigers Rubber Co., Ltd., Takatsuki-shi, Japan, a corporation of Japan
Filed Aug. 4, 1966, Ser. No. 570,361
Int. Cl. A47l 9/24; F16l 11/10
U.S. Cl. 138—122                    1 Claim

ABSTRACT OF THE DISCLOSURE

An extensible and retractable hose characterized by a helically corrugated thin wall structure with an external ridge and an internal fold extending radially inwardly with each surface of the fold having substantially the same inclination with respect to the longitudinal axis of the hose in the contracted state. The hose wall is formed of a relatively soft flexible resinous material while the helical ridge is formed of relatively hard resinous material.

---

This invention relates to corrugated extensible hoses and more particularly to those of the type including a thin-walled corrugated tube of a soft flexible material and a rib member of a hard resilient material helically wound about said corrugated tube and secured integrally therewith.

The present invention has for its object to provide a new and improved corrugated extensible hose of the type described which is designed to maintain a fully contracted state by itself unless subjected to tension and thus to exhibit immeasurable merits when used with an electric vacuum cleaner, a hair drier or other implement particularly requiring proper extension and contraction characteristics of its air suction or discharge hose.

Another object of the present invention is to provide a method of making such improved corrugated hose.

In the past, flexible hoses of the type described have had only a limited range of extension and contraction. For example, conventional corrugated suction hoses used with vacuum cleaners have been unable to contract beyond a certain limit since even in the fully contracted state a considerable space has remained between the adjacent folds of the corrugation. This means that the difference between the length of the suction hose when extended and that when contracted or released from tension has been limited and thus the hose has normally had a considerable length or bulk even when not extended for cleaning operation and caused storage inconvenience. After use of a vacuum cleaner, it has been usual to stow away the cleaner with the suction hose wound around the cleaner casing or stored therein in a coiled state or else hung separately on a room wall. In any case, the lengthy hose has obviously been a great nuisance to the user of the cleaner.

Also, the conventional hose during use of the vacuum cleaner has tended to form an excessive slack between its tip and base end connected with the body of the cleaner, precluding any efficient cleaning operation impossible. In addition, previously known suction hoses of the type concerned have been comprised of unnecessarily sturdy members and thus have been execessively heavy in weight.

Under these circumstances, the present invention is designed to overcome any of the above deficiencies involved in conventional extensible hoses of the type described.

According to the present invention, there is provided a corrugated extensible hose of the type described in which the corrugated tube is formed of a soft synthetic resin material such as polyvinyl chloride, polyethylene or polymer of polyethylene and vinyl acetate and is helically corrugated to form a helical external ridge and internal folds interconnecting the adjacent turns thereof and extending radially inward with an identical inclination to the tube axis and the rib member is formed of a hard synthetic resin material and, if desired, a steel wire embedded therein and is helically wound about said corrugated tube along the top of said helical external ridge thereof in adhesively secured relation, the successive turns of the helical rib member being normally substantially in contact with each other holding the internal folds of the corrugated tube substantially in closely contacting relation with each other, whereby the hose is normally in a state with its axial length reduced to the minimum and maintained in that state unless subjected to tension.

According also to the present invention, there is provided a method of making a corrugated extensible hose of the type described which comprises the steps of inflating a thin-walled tube of a soft synthetic resin material, fitting the inflated tube over a mandrel to tightly cover the latter, winding a rib member of a hard synthetic resin material, if desired, with a steel wire embedded therein helically about the peripheral surface of said tube in a substantially large axial pitch and adhesively securing said rib member to the tube surface, withdrawing said tube with said rib member secured thereto from said mandrel, reducing the axial length of said tube to corrugate the latter in such a manner that the successive turns of said helical rib member are set substantially in contact with each other holding the internal folds of the tube wall formed inside substantially in close contact with each other, forcibly inserting into the corrugated tube and rib assembly a second mandrel having an outer diameter more or less larger than the diameter of the tube bore defined by the internal folds of the corrugated tube wall thereby forcing the folds to incline in one axial direction at substantially the same angle to the tube axis under the drag of said second mandrel acting against the folds, heating the corrugated tube and rib assembly with said second molding core inserted therein for a predetermined length of time and subsequently cooling the assembly thereby to set the folds of the corrugated tube wall in the inclined mutually contacting state to obtain a finished product including the helical rib member secured integrally to the external helical ridge of the corrugated tube with its internal folds normally contacting each other and inclining in one axial direction at substantially the same angle to the tube axis.

The foregoing and other objects, features and advantages of the present invention will become apparent from the following detailed description when taken in conjunction with the accompanying drawings, which illustrate one preferred embodiment of the invention and in which:

FIG. 1 is a side elevation, partly in cross section, showing the inventive corrugated hose in its normal or fully contracted state;

FIG. 2 is an end view of the hose shown in FIG. 1;

FIG. 3 is a side elevation, partly in cross section, showing the hose in its fully extended state;

FIG. 4 is a cross-sectional view substantially taken along the line A—A in FIG. 3;

FIG. 5 illustrates one practical use of the inventive corrugated hose with an electric vacuum cleaner.

Figure 6:
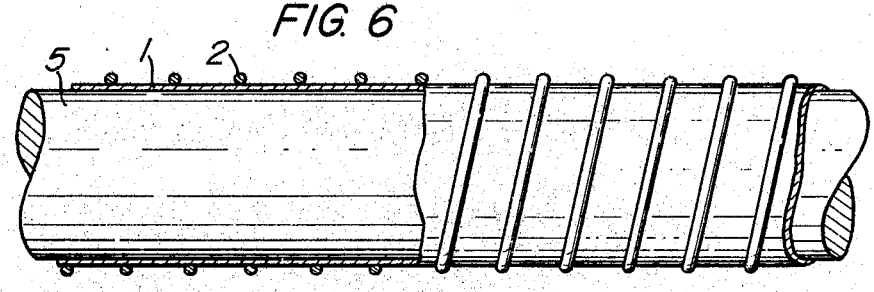
FIGS. 6, 7 and 8 illustrate the inventive method of making the corrugated hose at its different stages.

Referring to the drawings and first to FIGS. 1 to 4, inclusice, reference numeral 1 indicates a hose-forming tube formed of a film of a plastic material such as a soft synthetic resin. As will be apparent, an appropriate net may be embedded in the tube material for the purpose of increasing the hose strength. In this case, it is possible to render the embedded net externally visible by employing a transparent tube material. A rib member 2 is wound helically about the tube 1. The rib member 2 is formed of a hard synthetic resin material and, if desired, a steel wire embedded therein and adhesively secured to the external helical ridge of the tube 1 as indicated at 3 to complete the corrugated hose a. In FIGS. 1 and 2, the hose is shown in its fully contracted state it assumes when not in use, that is, when not subjected to any tension or pulling force. In this state, the successive turns of the helical rib 2 is substantially in contact with each other as shown. Also in this state, the tube folds 4 formed inside the corrugated hose a closely lap over each other as clearly seen in the left-hand half of FIG. 1. In other words, it is to be noted that the tube 1 and helical rib member 2 are both treated in advance so that they normally assume the state shown. In FIGS. 3 and 4, the hose a is shown in its stretched or fully extended state. It is to be understood that the hose a in this state restores its normal state shown in FIGS. 1 and 2 by itself as soon as it is released from tension. It has been found that the ratio of the length of the hose in its fully contracted state to that of the fully extended hose amounts to approximately 1 to 5.

In FIG. 5, illustrating one application of the inventive hose, reference numeral 9 indicates the body of an electric vacuum cleaner, which includes a cavity 10 for accommodating the suction hose a. Reference numeral 11 indicates a tubular joint interconnecting the hose a and a suction attachment 12 and reference numeral 13 indicates an electric cord for connection with an electric power source.

Figure 7:
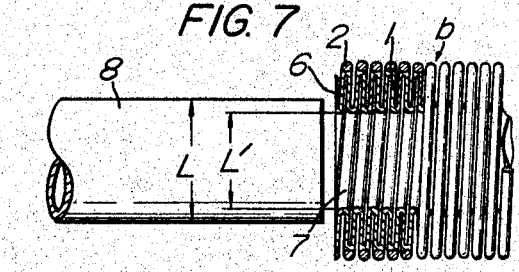
Figure 8:
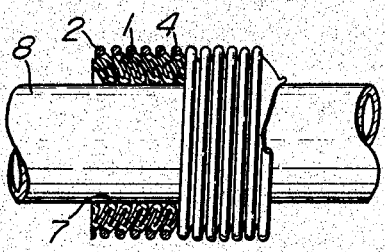

Description will next be made on the method of making the inventive hose with reference to FIGS. 6, 7 and 8.

At the start, compressed air is introduced into the tube 1 to inflate it and maintain its increased diameter. Then, a mandrel 5 having an outer diameter larger than the inner diameter of the tube 1 in its normal or uninflated state is inserted into the inflated tube. Subsequently, the compressed-air pressure is released to allow the tube 1 to shrink tightly covering the mandrel 5.

Then, the rib member 2 is helically wound around the tube 1 on the molding core 5 in a considerably large pitch and adhesively secured to the tube surface. In one practical example of the present invention, the tube 1 had initially a normal inner diameter of 27 mm. and the mandrel 5 had an outer diameter of 40 mm. The rib member 2 had an outer diameter of 1.4 mm. and was wound on the tube 1 mounted on the core 5 in a pitch of approximately 13 mm.

After the helical rib member 2 has been completely secured to the tube surface, the tube 1 is withdrawn from the core 5 and compressive forces are applied to the rib-carrying tube 1 at its opposite ends in axially opposite directions to forcibly compress the tube axially thereof until the successive turns of the helical rib 2 are brought into contact with each other. It is obvious that if in this state the compressive forces be removed, the tube immediately will restore its state shown in FIG. 6. Under this situation, in order to maintain the compressed state of the tube and rib assembly b, a second mandrel 8 is forced axially into the tube bore 7 defined by the folds 6 formed inside when the tube wall has previously been corrugated under compression. As indicated in FIG. 7, the mandrel 8 has an outer diameter, L, which is more or less larger than the diameter, L', of the tube bore 7. Because of this diameter difference, the corrugated tube folds 6 are forced to incline uniformly in one axial direction as shown in FIG. 8, under the drag of the mandrel 8 acting on the folds when it is inserted into the corrugated tube 1. Under this condition, shown in FIG. 8, hot air or steam is directed through the molding core 8 to heat-treat the tube and rib assembly through the intermediary of the mandrel 8 and subsequently the assembly is cooled down to set. In one preferred example of the heat treatment, the corrugated tube and rib assembly shown in FIG. 8 is held at a temperature between 90° C. and 95° C. for a predetermined length of time and thereafter is cooled down to set in the fully compressed state of FIG. 8. After completion of the heat setting, the mandrel 8 is withdrawn to obtain a finished product. In one example of the product, the outer diameter of the hose or its helical rib is approximately 44 mm. and the corrugated tube has an inner diameter of approximately 26.7 mm.

While the invention has been described in connection with one preferred embodiment thereof, it is to be clearly understood that the invention is not to be restricted to the features described above and shown in the drawings but may be varied in many ways without departing from the spirit of the invention.

What is claimed is:

1. A method of making a corrugated extensible hose of the type including a thin-walled corrugated tube of a soft flexible material and a rib member of a hard resilient material helically wound around said corrugated tube in integrally secured relation thereto, said method comprising the steps of inflating a thin-walled tube of a soft synthetic resin material, fitting the inflated tube over a mandrel to tightly cover the latter, winding a rib member of a hard synthetic resin material, with a steel wire embedded therein helically about the peripheral surface of said tube in a substantially large axial pitch, adhesively securing said rib member to the tube surface, withdrawing said tube with said rib member secured thereto from said mandrel, reducing the axial length of the tube and rib assembly to corrugate said tube in such a manner that the successive turns of said rib member are set substantially in contact with each other holding the internal folds of the tube wall formed inside substantially in close contact with each other, forcibly inserting into the corrugated tube and rib assembly a second mandrel having an outer diameter more or less larger than the diameter of the tube bore defined by the internal folds of the corrugated tube wall thereby forcing the folds to incline in one axial direction at substantially the same angle to the tube axis under the drag of said second mandrel acting against the folds, heating the corrugated tube and rib assembly with said second mandrel inserted therein for a predetermined length of time and subsequently cooling the assembly thereby to set the folds of the corrugated tube wall in the inclined mutually contacting state to obtain a finished product including the helical rib member secured integrally to the external helical ridge of the corrugated tube with its internal folds normally contacting each other and inclining in one axial direction at substantially the same angle to the tube axis.

References Cited

UNITED STATES PATENTS

| 2,743,759 | 5/1956  | Snow et al.     | 156—143 |
| 3,028,289 | 4/1962  | Roberts et al.  | 156—143 |
| 3,080,891 | 3/1963  | Duff            | 138—122 |
| 2,954,802 | 10/1960 | Duff            | 138—122 |
| 3,152,618 | 10/1964 | Rothermel et al.| 138—122 |
| 3,239,400 | 3/1966  | Anselm          | 156—171 |
| 3,248,272 | 4/1966  | Sawada          | 156—143 |

PATRICK D. LAWSON, Primary Examiner

U.S. Cl. X.R.

156—143